United States Patent
Cui et al.

(10) Patent No.: US 10,072,504 B2
(45) Date of Patent: Sep. 11, 2018

(54) ALLOY, WELDED ARTICLE AND WELDING PROCESS

(71) Applicant: GENERAL ELECTRIC COMPANY, Schenectady, NY (US)

(72) Inventors: Yan Cui, Greer, SC (US); Srikanth Chandrudu Kottilingam, Simpsonville, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 520 days.

(21) Appl. No.: 14/978,895

(22) Filed: Dec. 22, 2015

(65) Prior Publication Data

US 2017/0175533 A1  Jun. 22, 2017

(51) Int. Cl.
 *C22C 19/07* (2006.01)
 *F01D 5/14* (2006.01)
 (Continued)

(52) U.S. Cl.
 CPC .............. *F01D 5/147* (2013.01); *B23K 9/167* (2013.01); *B23K 10/02* (2013.01); *B23K 15/0046* (2013.01); *B23K 26/211* (2015.10); *B23K 35/3046* (2013.01); *C22C 19/07* (2013.01); *F01D 5/02* (2013.01); *F01D 5/225* (2013.01); *F01D 9/02* (2013.01); *F01D 11/00* (2013.01); *F23R 3/42* (2013.01); *B23K 2201/001* (2013.01); *F05D 2220/32* (2013.01); *F05D 2230/232* (2013.01); *F05D 2240/35* (2013.01); *F05D 2300/177* (2013.01)

(58) Field of Classification Search
 None
 See application file for complete search history.

(56) References Cited

U.S. PATENT DOCUMENTS

2006/0134454 A1  6/2006  Sathian et al.
2006/0134455 A1  6/2006  Belhadjhamida et al.
2013/0156555 A1  6/2013  Budinger et al.

FOREIGN PATENT DOCUMENTS

| EP | 0531083 A2 | 3/1993 |
|---|---|---|
| EP | 1521859 A1 | 4/2005 |
| WO | 2012135093 A2 | 10/2012 |

OTHER PUBLICATIONS

STIC 1700, Search Report, Produced 2018, USPTO Electonic Information Center.*

(Continued)

*Primary Examiner* — Eldon Brockman
(74) *Attorney, Agent, or Firm* — McNees Wallace & Nurick LLC

(57) ABSTRACT

An alloy is disclosed, including, by weight, about 13% to about 17% chromium, about 16% to about 20% molybdenum, about 1.5% to about 4% silicon, about 0.7% to about 2% boron, about 0.9% to about 2% aluminum, about 23% to about 27% nickel, about 0.8% to about 1.2% tantalum, and a balance of cobalt. The alloy includes a reduced occurrence of molybdenum silicide Laves phase relative to T800. A welded article is disclosed, including an article and a weld filler deposit joined to the article. The weld filler deposit includes a weld filler material including the alloy. A welding process is disclosed, including applying the weld filler material to the article and forming the weld filler deposit.

20 Claims, 1 Drawing Sheet

(51) Int. Cl.
  *B23K 35/30*   (2006.01)
  *B23K 9/167*   (2006.01)
  *B23K 10/02*   (2006.01)
  *B23K 15/00*   (2006.01)
  *B23K 26/211*  (2014.01)
  *F01D 5/22*    (2006.01)
  *F01D 9/02*    (2006.01)
  *F23R 3/42*    (2006.01)
  *F01D 5/02*    (2006.01)
  *F01D 11/00*   (2006.01)
  *B23K 101/00*  (2006.01)

(56) References Cited

OTHER PUBLICATIONS

STIC 3700, Search Report, Produced 2018, USPTO Electonic Information Center.*
Schmidt R. D., et al., "New Materials Resistant to Wear and Corrosion to 1000 DEG C", Wear, vol. 32, No. 3, XP009017626, pp. 279-289, 1975.
European Search Report and Opinion issued in connection with corresponding EP Application No. 16205052.0 dated Apr. 13, 2017.

* cited by examiner

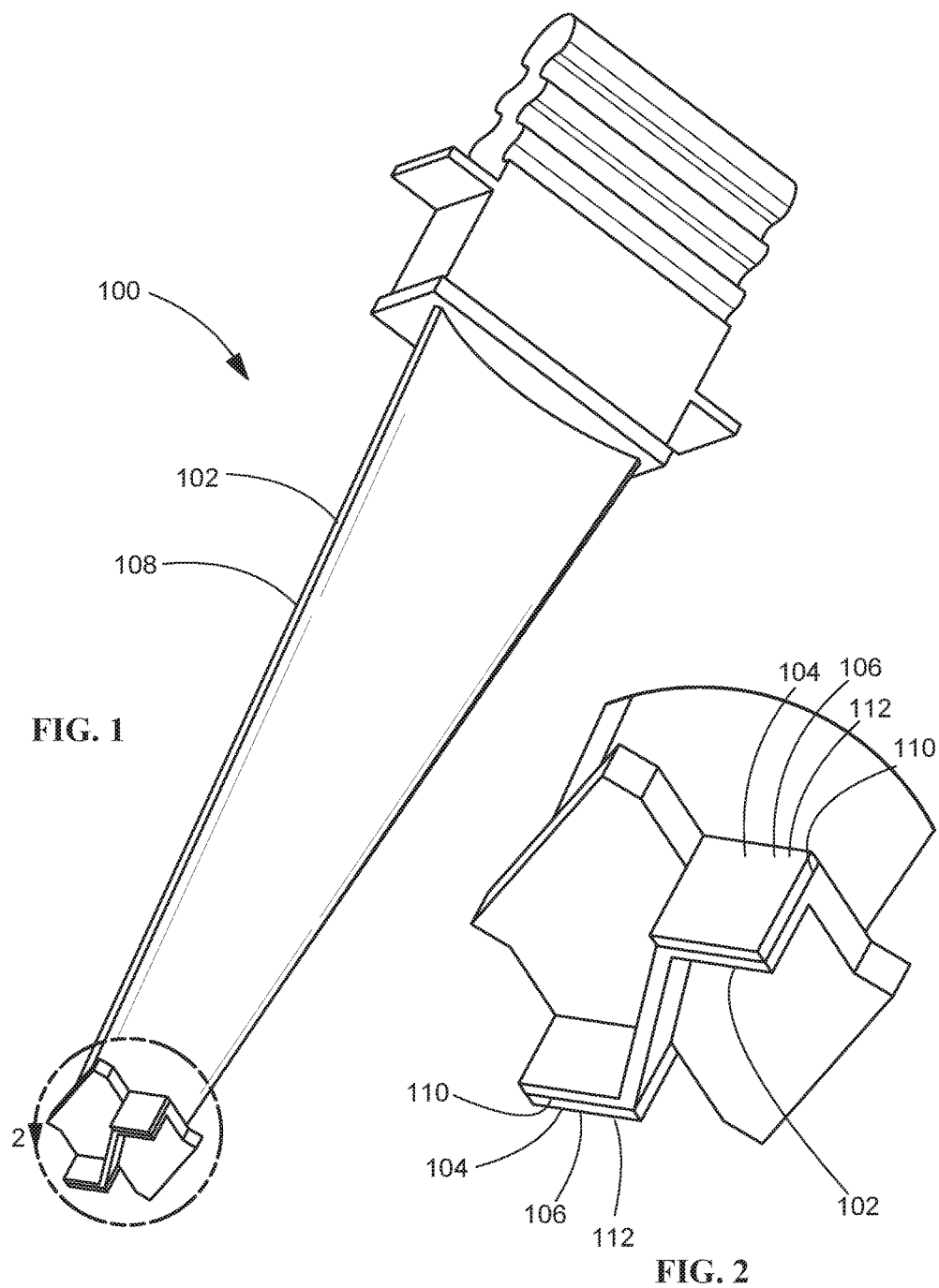

ALLOY, WELDED ARTICLE AND WELDING PROCESS

FIELD OF THE INVENTION

The present invention is directed to alloys, welded articles and welding processes. More particularly, the present invention is directed to alloys, welded articles incorporating the alloys, and welding processes using the alloys, wherein the alloys include reduced occurrences of molybdenum silicide Laves phase relative to T800.

BACKGROUND OF THE INVENTION

Hard-to-weld (HTW) alloys, such as nickel-based superalloys and certain aluminum-titanium alloys, due to their gamma prime and various geometric constraints, are susceptible to gamma prime strain aging, liquation and hot cracking. These materials are also difficult to join when the gamma prime phase is present in volume fractions greater than about 30%, which may occur when aluminum or titanium content exceeds about 3%. As used herein, an "HTW alloy" is an alloy which exhibits liquation, hot and strain-age cracking, and which is therefore impractical to weld.

These HTW alloys may be incorporated into components of gas turbine engines such as airfoils, blades, shrouded blades, nozzles, shrouds, contact pads applied to inter-shroud contact surfaces of shrouded turbine blades, combustors, rotating turbine components, wheels, seals, 3d-manufactured components with HTW alloys and other hot gas path components. As used herein, "blade" is synonymous with "bucket", and "vane" is synonymous with "nozzle". Incorporation of these HTW alloys may be desirable due to often superior operational properties, particularly for certain components subjected to the most extreme conditions and stresses.

Shrouded blades are often made of nickel-based superalloys or other high temperature superalloys designed to retain high strength at high temperature. The material of the blade shrouds and the interlocking notch may lack sufficient hardness to withstand wear stresses and rubbing which occur during start-up and shut-down of a turbine engine, as the shrouded blades twist to an "interlocked" and "non-interlocked" position, respectively. Due to the relatively low Rockwell hardness of the typical materials of the blade shrouds and the interlocking notch, the interlocks may wear, resulting in gaps opening between the blade shrouds, thereby allowing the airfoils to twist and further deform, and even to possibly vibrate during operation which is highly undesirable as such imparts additional higher stresses on the blades which can quickly lead to blade breakage and consequent failure of the turbine. Contact pads may be applied to the inter-shroud contact surfaces of the interlocking notches to restore the interlocking capability of worn interlocking notches. However, desirable welding techniques such as gas tungsten arc welding, shielded metal arc welding, plasma arc welding, laser beam welding, and electron beam welding, are impractical to use to join contact pads to the inter-shroud contact surfaces where either or both of the contact pads and the inter-shroud contact surfaces incorporate HTW alloys.

BRIEF DESCRIPTION OF THE INVENTION

In an exemplary embodiment, an alloy includes, by weight, about 13% to about 17% chromium, about 16% to about 20% molybdenum, about 1.5% to about 4% silicon, about 0.7% to about 2% boron, about 0.9% to about 2% aluminum, about 23% to about 27% nickel, about 0.8% to about 1.2% tantalum, and a balance of cobalt. The alloy includes a reduced occurrence of molybdenum silicide Laves phase relative to T800.

In another exemplary embodiment, a welded article includes an article and a weld filler deposit joined to the article. The weld filler deposit includes a weld filler material. The weld filler material includes an alloy, wherein the alloy includes, by weight, about 13% to about 17% chromium, about 16% to about 20% molybdenum, about 1.5% to about 4% silicon, about 0.7% to about 2% boron, about 0.9% to about 2% aluminum, about 23% to about 27% nickel, about 0.8% to about 1.2% tantalum, and a balance of cobalt.

In another exemplary embodiment, a welding process includes applying a weld filler material to an article and forming a weld filler deposit including the weld filler material. The weld filler deposit is joined to the article. The weld filler material includes an alloy, wherein the alloy includes, by weight, about 13% to about 17% chromium, about 16% to about 20% molybdenum, about 1.5% to about 4% silicon, about 0.7% to about 2% boron, about 0.9% to about 2% aluminum, about 23% to about 27% nickel, about 0.8% to about 1.2% tantalum, and a balance of cobalt.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1 is a perspective view of a welded article, according to an embodiment of the present disclosure.

FIG. 2 is an expanded view of area 2 of FIG. 1, according to an embodiment of the present disclosure.

Wherever possible, the same reference numbers will be used throughout the drawings to represent the same parts.

DETAILED DESCRIPTION OF THE INVENTION

Provided are exemplary alloys, welded articles and welding processes. Embodiments of the present disclosure, in comparison to articles and methods not utilizing one or more features disclosed herein, decrease costs, increase process control, increase reparability, improve mechanical properties, improve elevated temperature performance, increase weldability, decrease cracking, reduce process time, increase joint strength, or a combination thereof.

In one embodiment, an alloy (referred to as "the alloy") includes, by weight, about 13% to about 17% chromium, about 16% to about 20% molybdenum, about 1.5% to about 4% silicon, about 0.7% to about 2% boron, about 0.9% to about 2% aluminum, about 23% to about 27% nickel, about 0.8% to about 1.2% tantalum, and a balance of cobalt. The alloy includes a reduced occurrence of molybdenum silicide Laves phase relative to T800. The alloy may include less than about 2.5% iron.

Molybdenum silicide Laves phase includes high heat tolerance (2840° F. melting point) and material strength, yielding wear resistance and high temperature resistance properties in some HTW alloys. However, the hardness and brittleness of the molybdenum silicide Laves phase may also contribute to the property of poor weldability of some HTW alloys.

In a further embodiment, the alloy includes less than about 2.5%, alternatively less than about 2%, alternatively less than about 1.5%, alternatively less than about 1%, alternatively less than about 0.5%, alternatively less than about 0.25%, incidental impurities. As used herein, "incidental impurities" refers to the cumulative inclusion of any elements in the alloy other than chromium, molybdenum, silicon, boron, aluminum, iron, nickel, tantalum, and cobalt. Further, "incidental impurities" excludes any oxygen present in a surface oxide layer disposed on the alloy as a result of surface oxidation of the alloy.

In another embodiment, the alloy includes, by weight, about 14% to about 16% chromium, about 17% to about 18% molybdenum, about 2% to about 3% silicon, about 1% to about 1.5% boron, about 1% to about 1.5% aluminum, about 24% to about 26% nickel, about 0.9% to about 1.1% tantalum, and a balance of cobalt. The alloy may include less than about 2% iron. In a further embodiment, the alloy includes less than about 2.5%, alternatively less than about 2%, alternatively less than about 1.5%, alternatively less than about 1%, alternatively less than about 0.5%, alternatively less than about 0.25%, incidental impurities.

In yet another embodiment, the alloy includes, by weight, about 15% chromium, about 18% molybdenum, about 2.5% silicon, about 1.2% boron, about 1.2% aluminum, about 25% nickel, about 1% tantalum, and a balance of cobalt. The alloy may include less than about 1.5% iron. In a further embodiment, the alloy includes less than about 2.5%, alternatively less than about 2%, alternatively less than about 1.5%, alternatively less than about 1%, alternatively less than about 0.5%, alternatively less than about 0.25%, incidental impurities.

In one embodiment, the alloy consists of, by weight, about 13% to about 17% chromium, about 16% to about 20% molybdenum, about 1.5% to about 4% silicon, about 0.7% to about 2% boron, about 0.9% to about 2% aluminum, about 23% to about 27% nickel, about 0.8% to about 1.2% tantalum, less than about 2.5%, alternatively less than about 2%, alternatively less than about 1.5%, iron, less than about 2.5%, alternatively less than about 2%, alternatively less than about 1.5%, alternatively less than about 1%, alternatively less than about 0.5%, alternatively less than about 0.25%, incidental impurities, and a balance of cobalt.

In another embodiment, the alloy consists of, by weight, about 14% to about 16% chromium, about 17% to about 18% molybdenum, about 2% to about 3% silicon, about 1% to about 1.5% boron, about 1% to about 1.5% aluminum, about 24% to about 26% nickel, about 0.9% to about 1.1% tantalum, less than about 2.5%, alternatively less than about 2%, alternatively less than about 1.5%, iron, less than about 2.5%, alternatively less than about 2%, alternatively less than about 1.5%, alternatively less than about 1%, alternatively less than about 0.5%, alternatively less than about 0.25%, incidental impurities, and a balance of cobalt.

In yet another embodiment, the alloy consists of, by weight, about 15% chromium, about 18% molybdenum, about 2.5% silicon, about 1.2% boron, about 1.2% aluminum, about 25% nickel, about 1% tantalum, less than about 2.5%, alternatively less than about 2%, alternatively less than about 1.5%, iron, less than about 2.5%, alternatively less than about 2%, alternatively less than about 1.5%, alternatively less than about 1%, alternatively less than about 0.5%, alternatively less than about 0.25%, incidental impurities, and a balance of cobalt.

Referring to FIGS. 1 and 2, in one embodiment, a welded article 100 includes an article 102 and a weld filler deposit 104 joined to the article 102. The weld filler deposit 104 includes a weld filler material 106. The weld filler material 106 includes the alloy, and may consist of the alloy.

In one embodiment, the article 102 includes an HTW alloy. The HTW alloy may be any suitable HTW alloy, including, but not limited to, GTD 111, GTD 444, INCONEL 738, René 108, René N2, René N5, or T800.

As used herein, "GTD 111" refers to an alloy including a composition, by weight, of about 14% chromium, about 9.5% cobalt, about 3.8% tungsten, about 4.9% titanium, about 3% aluminum, about 0.1% iron, about 2.8% tantalum, about 1.6% molybdenum, about 0.1% carbon, and a balance of nickel.

As used herein, "GTD 444" refers to an alloy including a composition, by weight, of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15% hafnium, and a balance of nickel.

As used herein, "INCONEL 738" refers to an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel.

As used herein, "René 108" refers to an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel.

As used herein, "René N2" refers to an alloy including a composition, by weight, of about 7.5% cobalt, about 13% chromium, about 6.6% aluminum, about 5% tantalum, about 3.8% tungsten, about 1.6% rhenium, about 0.15% hafnium, and a balance of nickel.

As used herein, "René N5" refers to an alloy including a composition, by weight, of about 7.5% cobalt, about 7.0% chromium, about 6.5% tantalum, about 6.2% aluminum, about 5.0% tungsten, about 3.0% rhenium, about 1.5% molybdenum, about 0.15% hafnium, and a balance of nickel.

As used herein, "T800", also known as "TRIBALOY® T-800", refers to an alloy including a composition, by weight, about 16% chromium, about 28% molybdenum, about 3.4% silicon, about 3% nickel and iron, and a balance of cobalt.

The welded article 100 may be any suitable article, including, but not limited to, a turbine component. The gas turbine component may include, but is not limited to, an airfoil, a blade, a shrouded blade, a nozzle, a shrouded turbine blade 108, a combustor, a rotating turbine component, a wheel, a seal, a hot gas path component, or a combination thereof. In one embodiment (shown in FIGS. 1 and 2), the article 102 is a shrouded turbine blade 108 including an inter-shroud contact surface 110, the weld filler deposit 104 is a contact pad 112, and the contact pad 112 is joined to the inter-shroud contact surface 110. In a further embodiment, the inter-shroud contact surface includes an HTW alloy.

In one embodiment, a welding process includes applying the weld filler material 106 to the article 102, and forming the weld filler deposit 104 joined to the article 102. The weld filler deposit 104 includes the weld filler material 106, and the weld filler material 106 includes the alloy. In another embodiment, the weld filler material 106 consists of the alloy.

Applying the weld filler material 106 to the article 102 may include any suitable welding technique, including, but not limited to, at least one of gas tungsten arc welding, shielded metal arc welding, plasma arc welding, laser beam welding, and electron beam welding. The weld filler material 106 may be applied in successive passes of the same welding technique or different welding techniques.

The welding process may further include finishing the weld filler deposit 104. Any suitable finishing technique may be applied, including, but not limited to, heating, polishing, brushing, grinding, peening, chemically treating, or a combination thereof.

The welding process may be carried out at room temperature, meaning that the article 102, disregarding any thermal changes induced by the welding technique itself, is between about 10° C. and about 35° C., alternatively between about 15° C. and about 30° C., alternatively between about 18° C. and about 25° C., and that the article 102 is not preheated in preparation for the welding process.

During the welding process, fissures may form in the article 102. In one embodiment, the fissures formed during the welding process consist of microfissures less than about 0.05 inches long, alternatively less than about 0.04 inches long, alternatively less than about 0.03 inches long, alternatively less than about 0.02 inches long, alternatively less than about 0.01 inches long.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An alloy, comprising, by weight:
   about 13% to about 17% chromium;
   about 16% to about 20% molybdenum;
   about 1.5% to about 4% silicon;
   about 0.7% to about 2% boron;
   about 0.9% to about 2% aluminum;
   about 23% to about 27% nickel;
   about 0.8% to about 1.2% tantalum; and
   a balance of cobalt;
   wherein the alloy includes a reduced occurrence of molybdenum silicide Laves phase relative to T800.

2. The alloy of claim 1, further comprising, by weight, less than about 2.5% iron.

3. The alloy of claim 1, further comprising, by weight, less than about 2.5% incidental impurities.

4. The alloy of claim 1, wherein the alloy comprises, by weight:
   about 15% chromium;
   about 18% molybdenum;
   about 2.5% silicon;
   about 1.2% boron;
   about 1.2% aluminum;
   about 25% nickel; and
   about 1% tantalum.

5. The alloy of claim 1, consisting of:
   about 13% to about 17% chromium;
   about 16% to about 20% molybdenum;
   about 1.5% to about 4% silicon;
   about 0.7% to about 2% boron;
   about 0.9% to about 2% aluminum;
   about 23% to about 27% nickel;
   about 0.8% to about 1.2% tantalum;
   less than about 2.5% iron;
   less than about 2.5% incidental impurities; and
   a balance of cobalt.

6. The alloy of claim 5, consisting of:
   about 15% chromium;
   about 18% molybdenum;
   about 2.5% silicon;
   about 1.2% boron;
   about 1.2% aluminum;
   about 25% nickel;
   about 1% tantalum;
   less than about 2.5% iron;
   less than about 2.5% incidental impurities; and
   a balance of cobalt.

7. A welded article, comprising:
   an article; and
   a weld filler deposit joined to the article, the weld filler deposit including a weld filler material, the weld filler material including an alloy, the alloy including:
      about 13% to about 17% chromium;
      about 16% to about 20% molybdenum;
      about 1.5% to about 4% silicon;
      about 0.7% to about 2% boron;
      about 0.9% to about 2% aluminum;
      about 23% to about 27% nickel;
      about 0.8% to about 1.2% tantalum; and
      a balance of cobalt.

8. The welded article of claim 7, wherein the article includes a hard-to-weld (HTW) alloy.

9. The welded article of claim 8, wherein the HTW alloy is selected from the group consisting of René 108, GTD 111, GTD 444, René N2, René N5, Inconel 738, and T800.

10. The welded article of claim 7, wherein the article is a turbine component.

11. The welded article of claim 10, wherein the weld filler deposit is a contact pad, the turbine component is a shrouded turbine blade including an inter-shroud contact surface, and the contact pad is joined to the inter-shroud contact surface.

12. The welded article of claim 11, wherein the inter-shroud contact surface includes a hard-to-weld (HTW) alloy.

13. A welding process, comprising:
   applying a weld filler material to an article; and
   forming a weld filler deposit including the weld filler material, the weld filler deposit joined to the article, the weld filler material including an alloy, the alloy including:
      about 13% to about 17% chromium;
      about 16% to about 20% molybdenum;
      about 1.5% to about 4% silicon;
      about 0.7% to about 2% boron;
      about 0.9% to about 2% aluminum;
      about 23% to about 27% nickel;
      about 0.8% to about 1.2% tantalum; and
      a balance of cobalt.

14. The welding process of claim 13, wherein applying the weld filler material to the article includes welding the weld filler material to a hard-to-weld (HTW) alloy.

15. The welding process of claim 13, wherein applying the weld filler material to the article includes applying the weld filler material to a turbine component as the article.

16. The welding process of claim 15, wherein applying the weld filler material to the turbine component includes forming a contact pad as the weld filler deposit joined to an inter-shroud contact surface of a shrouded turbine blade as the turbine component.

17. The welding process of claim 13, wherein applying the weld filler material to the article includes applying the weld filler material to the article at room temperature.

18. The welding process of claim 13, further including forming fissures in the article, the fissures consisting of microfissures less than about 0.03 inches long.

19. The welding process of claim 13, wherein applying the weld filler material to the article includes a welding technique selected from the group consisting of at least one of gas tungsten arc welding, shielded metal arc welding, plasma arc welding, laser beam welding, and electron beam welding.

20. The welding process of claim 13, wherein applying the weld filler material to the article includes applying the weld filler material to the article in successive passes.

* * * * *